Patented May 19, 1925.

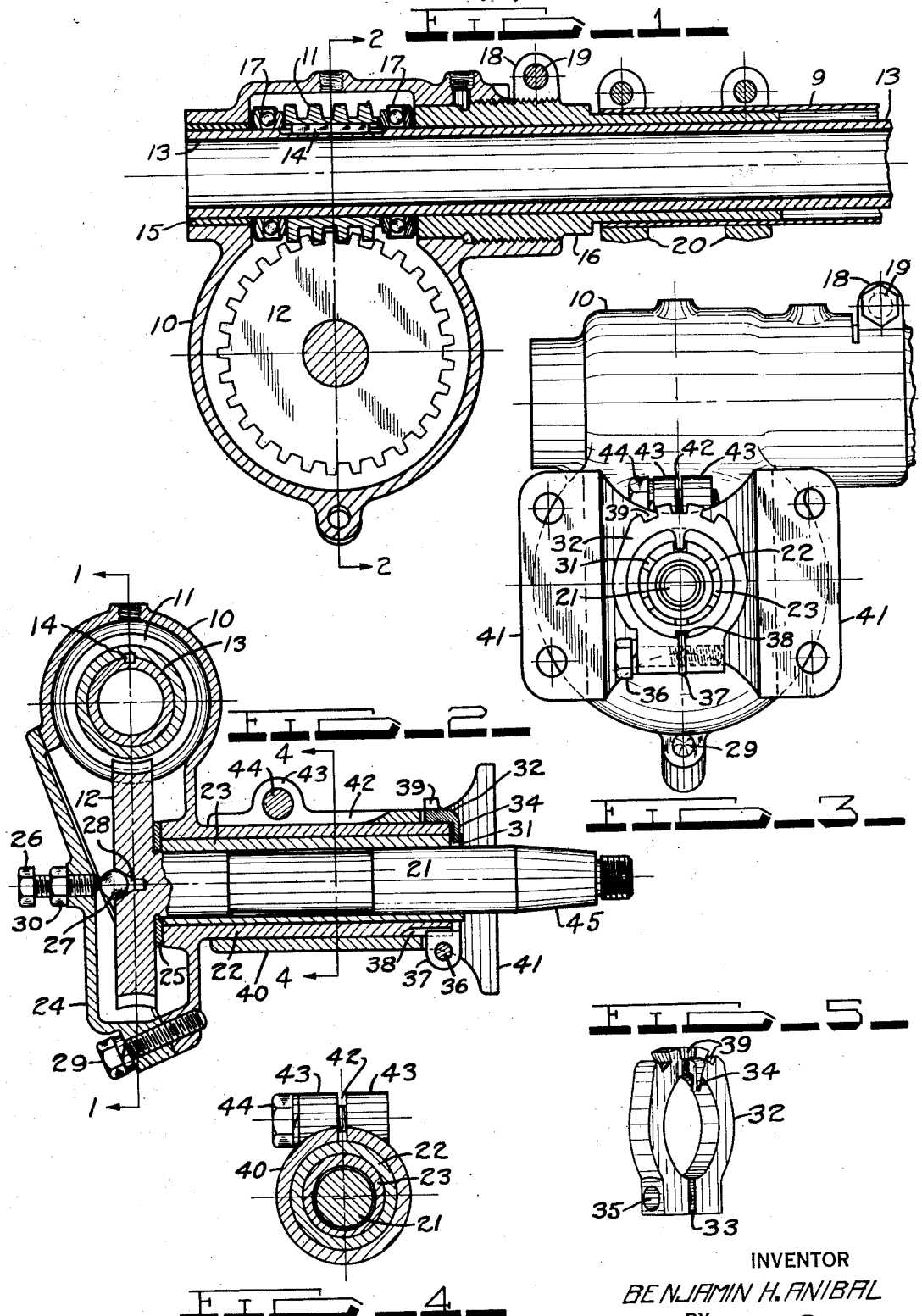

1,538,497

UNITED STATES PATENT OFFICE.

BENJAMIN H. ANIBAL, OF DETROIT, MICHIGAN, ASSIGNOR TO THE STUDEBAKER CORPORATION, OF SOUTH BEND, INDIANA, A CORPORATION OF NEW JERSEY.

STEERING MECHANISM.

Application filed July 3, 1924. Serial No. 723,891.

*To all whom it may concern:*

Be it known that I, BENJAMIN H. ANIBAL, a citizen of the United States of America, and resident of Detroit, in the county of Wayne and State of Michigan, have invented certain new and useful Improvements in Steering Mechanism, of which the following is a specification.

This invention relates to steering mechanisms and particularly to worm gear constructions provided with an eccentric bushing for one of the gears whereby the same can be variably adjusted in respect to the other gear.

The object of the present invention is to provide a new and novel means for locking the eccentric bushing in a variety of adjusted positions.

A further object is to provide a plurality of notches in one end of the bushing, and a clamp collar having a finger or projection adapted to engage one of the notches in the bushing, the bushing being adjusted by means of the collar and locked in adjusted position thereby when the clamp collar is clamped to a stationary support and prevented from turning relative thereto by means of a washer placed over the clamp screw in the slot of the clamp and which engages a notch in the stationary support.

The above being among the objects of the present invention, the same consists of certain features of construction and combination of parts to be hereinafter described with reference to the accompanying drawing and then claimed, having the above and other objects in view.

In the accompanying drawing which illustrates a suitable embodiment of the present invention, and in which like numerals refer to like parts throughout the several different views.

Figure 1 is a longitudinal sectional view, taken on the line 1—1 of Figure 2, of part of the lower end of an automobile steering gear of the worm and wheel type embodying the present invention.

Figure 2 is a sectional view taken on the line 2—2 of Figure 1.

Figure 3 is an end view of the steering gear taken looking in the same direction as Figure 1, showing the normal position of the eccentric bushing locking means.

Figure 4 is a section taken on the line 4—4 of Figure 2.

Figure 5 is a perspective view of the clamping member.

The steering gear shown in the accompanying drawing is particularly adapted for use with the present invention which is shown in conjunction therewith, and comprises a casing 10 for housing and supporting the worm 11, worm wheel 12 and other parts to be described hereafter. The worm 10 is mounted on the steering tube 13 and is secured against rotation thereon by the key 14. The steering tube 13 extends through the housing 10 and is journaled in the bushing 15 at its one end and in the nut 16 at the other end of the casing. The nut 16 is threadably received in the casing 10 and its inner end abuts against one of the ball thrust bearings 17 located around the tube 13 at either end of the worm 11 and thus controls the axial position of the worm 11. The end of the casing 10 adjacent the nut 16 is split and two ears 18 are provided on the casing on either side of the split through which a screw 19 is adapted to pass to draw the ears 18 together, clamping the end of the casing 10 about the nut 16 and thereby locking the latter in adjusted position. The extremity of the nut 16 is reduced in size and receives thereon the lower end of the steering post 9 which is clamped thereto by the clamp members 20. It is to be understood that a steering wheel, not shown, is secured to the end of the steering tube 13 opposite the worm 11 in the conventional manner.

The worm wheel 12, which is provided with an axially extending spindle 21 perpendicular to the axis of the worm 11, meshes with the worm 11 and is adapted to be turned thereby. The casing 10 is provided with an extending sleevelike projection 22 which receives the eccentric bushing 23 in which is journaled the worm wheel spindle 21. One side of the casing 10 is provided with an opening normally closed by the cap 24, the opening being of such dimensions as to allow the ready removal of the worm 11 and worm wheel 12. A washer 25 surrounding the spindle 21 between the worm gear 12 and casing 10 takes the thrust of the worm wheel 12 in that direction and a screw 26 threaded through the cap 24 in line with the axis of the worm gear 12 is adapted to bear against the ball bearing 27 seated in the axial recess 28 in worm wheel 12, thereby controlling the axial position of the latter and also acting to take the thrust of the gear in that direction. The cap 24 is secured to the casing 10 by the screws 29 and the screw 26 is locked in adjusted position by the nut 30.

The end of the eccentric bushing 23 opposite the worm wheel 12 projects beyond the end of the sleeve 22 and is provided with a plurality of radial slots 31. Surrounding the adjacent end of the sleeve 22 is a clamping member 32 provided with a radial slot 33 completely cutting through the one side of the same. Opposite the slot 33 and beyond the plane of the side of the clamping member 32 is an inwardly projecting finger 34 which is adapted to engage one of the slots 31 in the eccentric bushing 23. The slotted side of the clamping member 32 is provided with an opening 35 perpendicular to and passing through the slot 33, a screw 36 being adapted to pass through the opening 35 on one side of the slot and thread into it on the other side of the slot thereby to decrease the width of the same and to cause the member 32 to be clamped about the sleeve 22. A washer 37 (see Figure 3) of less thickness than the slot 33 is adapted to be inserted therein and be held by the screw 36 in engagement with the groove 38 provided in the end of the sleeve 22, thus preventing relative rotary movement between the sleeve 22 and member 32. Inasmuch as the washer 37 prevents relative movement between the sleeve 22 and the member 32, and the finger 34 on the member 32 prevents relative rotary movement between the latter and the eccentric bushing 23 it is evident that relative movement between the eccentric bushing 23 and sleeve 22 is prevented.

It is obvious that the purpose of the eccentric bushing 23 is to adjust the worm gear 12 to or from the worm 11 to correctly mesh the teeth of one in respect to the teeth of the other. When, because of wear or for any other reasons, it becomes necessary to readjust the meshing of the worm 11 and worm 12 by rotating the eccentric bushing 23, the screw 36 and washer 37 are removed which then allows the member 32 and eccentric bushing 23 to rotate relative to the sleeve 22. Pressure may then be applied to the member 32 to rotate the same by inserting a screw driver, punch or other instrument in one of the notches 39 formed in its upper edge for that purpose and applying pressure to it. The eccentric bushing 23 having been turned by the finger 34 an amount equal to the movement of the member 32, which in all cases must be equal to the distance between two or more slots 31, the member 32 is then slipped off of the end of the sleeve 22 and replaced with the slot 33 in line with the groove 38 and the finger 34 in a corresponding slot 31, the washer 37 and the screw 36 then being replaced and the screw 36 again drawn up to clamp the member 32 onto the sleeve 22 and locking all of the dependent parts in the adjusted position.

The steering gear is supported by a bracket composed of a sleeve portion 40 and divergent flanged arms 41, the latter of which are adapted to be secured to any suitable part of the automobile such as the frame (not shown). The sleeve portion 40 is of such dimensions as to receive the sleeve 22 of the casing 10 therein and one side thereof is provided with a slot 42 extending nearly the full length of the same. Ears 43 either side of the slot 42 receive the screw 44 which is adapted to draw the ears towards each other and thereby clamp the sleeve portion 40 about the sleeve 22, thereby holding the steering gear assembly in adjusted position.

Although not shown, it will be understood that a conventional steering arm is secured on the tapered end 45 of the spindle 21 for transmitting the movement of the spindle 21 to the conventional steering mechanism of the automobile of which it forms a part.

Formal changes may be made in the specific embodiment of the invention described without departing from the spirit and substance of the broad invention, the scope of which is commensurate with the appended claims.

What I claim is:—

1. In combination with a casing, intermeshing gears in said casing, spindles for supporting said gears, a bushing provided with a plurality of notches in one end thereof, in which one of said spindles is eccentrically journaled, a rotatable ring member having a slot through one side thereof mounted on said casing, a projection on said ring engageable with one of said notches, a groove in said casing, a locking member positioned within said slot and projecting into said groove, and means for drawing said ring into close relationship with said collar and for holding said locking member in operative position.

2. In combination, a casing provided with a projecting sleeve having a groove in its outer surface, a bushing rotatably positioned within said sleeve and provided with a plurality of notches in one end thereof, a spindle eccentrically journaled in said bushing, a worm wheel on said spindle within said casing, a worm on a second spindle meshing with said worm gear, a rotatable, contractible member surrounding said sleeve provided with means for engaging one of said notches, a locking member engageable with said groove carried by said member, and means for causing said member to contract about said sleeve.

3. The combination of a steering spindle having a gear thereon, a steering shaft provided with a worm meshing with said gear, an eccentric bearing for said spindle having a plurality of notches in one end thereof, a casing provided with a socket portion for rotatably receiving said bearing and having a notch in its outer surface, and contractible means surrounding said casing having projections co-operating therewith for simultaneously engaging one of said notches in said eccentric bushing and said groove in said casing.

4. The combination of a steering spindle having a gear thereon, a steering tube provided with a worm meshing with said gear, an eccentric bearing for said spindle provided with a plurality of notches in one end thereof, a casing for said gears provided with a projecting sleeve for rotatably receiving said bearing, said sleeve being provided with a groove, a split ring surrounding said sleeve and provided with a lug for engaging one of said notches, a locking member engageable with said groove, and means for securing said locking member between the split ends of said ring and for clamping said ring on said sleeve.

5. In a device of the class described, a steering spindle having a gear thereon, a steering tube having a worm thereon meshing with said gear, a bushing provided with a plurality of notches, in which said spindle is eccentrically mounted, a casing for housing said gears provided with an extending sleeve for rotatably receiving said bushing, a groove in said sleeve, a rotatable split ring surrounding said sleeve provided with a lug for engagement with one of said notches and ears on either side of the split ends thereof, a removable member between the split ends of said ring projecting into said groove, means for holding said member in position and drawing said ears together, and tool receiving means on said ring for causing rotation thereof.

Signed by me at Detroit, Michigan, U. S. A., this 28 day of June 1924.

BENJAMIN H. ANIBAL.

Witnesses:
HODGSON S. PIERCE,
DONALD Z. WAITE.